(12) United States Patent
Gopalakrishnan et al.

(10) Patent No.: US 7,356,346 B2
(45) Date of Patent: Apr. 8, 2008

(54) METHOD OF UPLINK SCHEDULING FOR DATA COMMUNICATION

(75) Inventors: Nandu Gopalakrishnan, Chatham, NJ (US); Srinivas R. Kadaba, Chatham, NJ (US); Ashok N. Rudrapatna, Basking Ridge, NJ (US); Ganapathy Subramanian Sundaram, Hillsborough, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 925 days.

(21) Appl. No.: 10/186,007

(22) Filed: Jun. 28, 2002

(65) Prior Publication Data

US 2004/0203968 A1    Oct. 14, 2004

(51) Int. Cl.
*H04B 7/00* (2006.01)
(52) U.S. Cl. .................. 455/512; 455/513; 455/67.13; 455/63.1
(58) Field of Classification Search ................ 455/512, 455/447, 450, 522, 69, 439; 370/335, 389
See application file for complete search history.

(56) References Cited

U.S. PATENT DOCUMENTS

| | | | |
|---|---|---|---|
| 5,751,708 A * | 5/1998 | Eng et al. .............. | 370/395.42 |
| 6,169,759 B1 | 1/2001 | Kanterakis et al. ......... | 375/130 |
| 6,301,286 B1 | 10/2001 | Kanterakis et al. ......... | 375/130 |
| 6,519,449 B1 * | 2/2003 | Zhang et al. .............. | 455/69 |
| 6,615,054 B2 * | 9/2003 | Terry et al. .............. | 455/522 |
| 6,775,256 B1 * | 8/2004 | Hill et al. .............. | 370/335 |
| 6,791,961 B2 * | 9/2004 | Zeira et al. .............. | 370/335 |
| 6,845,100 B1 * | 1/2005 | Rinne .............. | 370/395.43 |
| 2002/0107021 A1 * | 8/2002 | Ishikawa et al. .............. | 455/436 |
| 2002/0155835 A1 * | 10/2002 | Pankaj et al. .............. | 455/439 |
| 2003/0013451 A1 * | 1/2003 | Walton .............. | 455/447 |
| 2003/0026356 A1 * | 2/2003 | Brommer .............. | 375/324 |
| 2003/0166408 A1 * | 9/2003 | Zhang et al. .............. | 455/522 |
| 2004/0146033 A1 * | 7/2004 | Soderstrom et al. .............. | 370/338 |
| 2005/0013273 A1 * | 1/2005 | Zhang .............. | 370/328 |

OTHER PUBLICATIONS

Pending U.S. Appl. No. 09/851,100, filed May 8, 2001 (Gopalakrishnan 9-7-19-9).
Pending U.S. Appl. No. 09/569,684, filed Sep. 13, 2002 (Joshi 1-4-5).

* cited by examiner

*Primary Examiner*—Matthew D. Anderson
*Assistant Examiner*—Tan Trinh

(57) ABSTRACT

A method of scheduling data communication over an uplink. The method enables two or more users seeking to transmit data over the uplink to be scheduled in response to their path loss. The user having the most attractive determined path loss among the two or more users seeking to transmit data over the uplink us scheduled first. Thereafter, the next user having the next most attractive path loss among the remaining users may be subsequently scheduled if the total noise rise leftover is greater than zero. This process repeats so long as or until the total noise rise leftover is about zero.

19 Claims, 3 Drawing Sheets

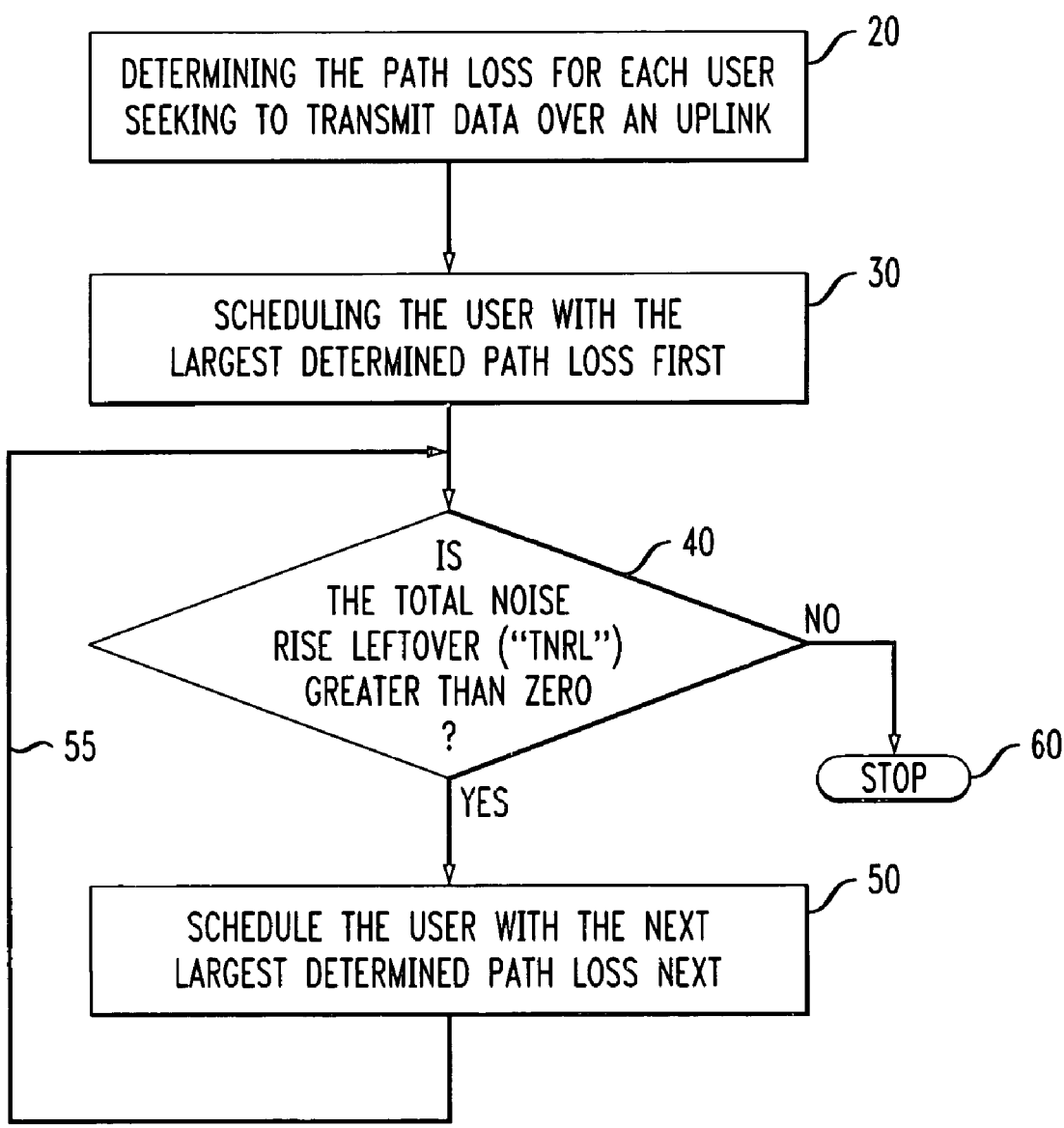

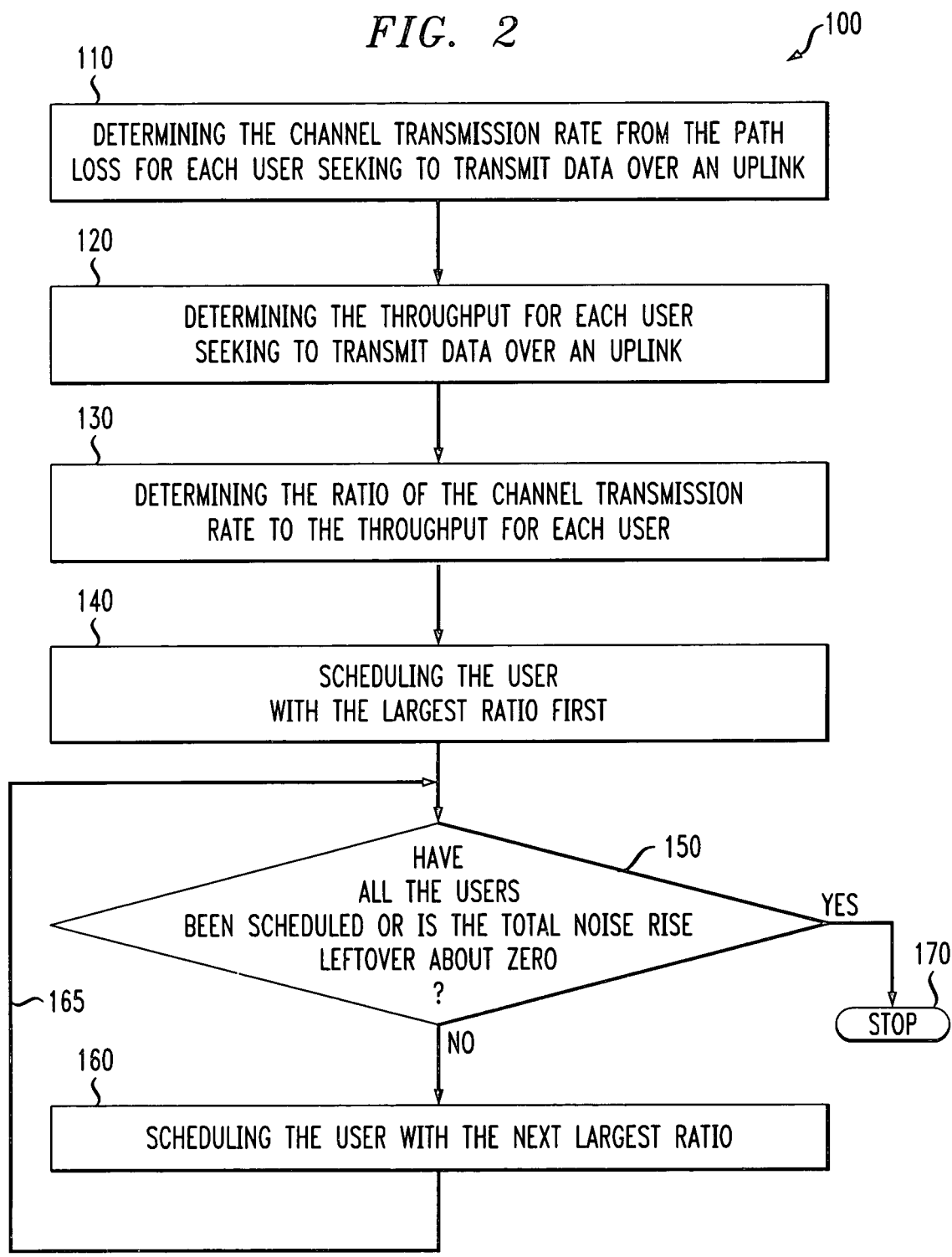

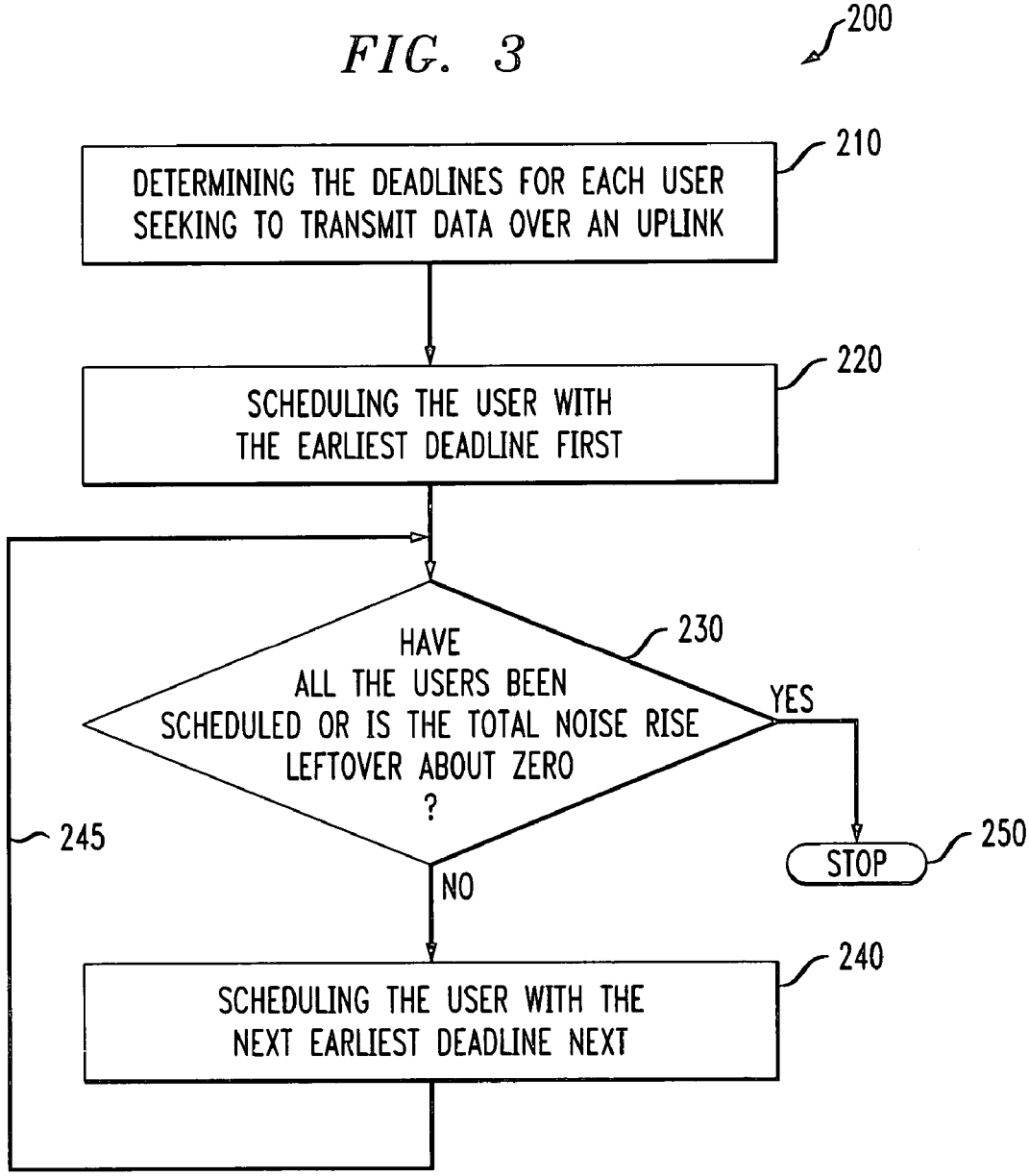

METHOD OF UPLINK SCHEDULING FOR DATA COMMUNICATION

BACKGROUND OF THE INVENTION

I. Field of the Invention

The present invention relates to wireless communications, and more particularly, to a method of uplink scheduling for data communication.

II. Description of the Related Art

Wireless communications systems employ a number of geographically distributed, cellular communication sites or base stations. Each base station supports the transmission and reception of communication signals to and from stationary or fixed, wireless communication devices or units. Each base station handles communications over a particular region commonly referred to as a cell/sector. The overall coverage area for a wireless communications system is defined by the union of cells for the deployed base stations. Here, the coverage areas for adjacent or nearby cell sites may overlap one another to ensure, where possible, contiguous communications coverage within the outer boundaries of the system.

When active, a wireless unit receives signals from at least one base station over a forward link or downlink and transmits signals to at least one base station over a reverse link or uplink. There are many different schemes for defining links or channels for a cellular communication system, including, for example, TDMA (time-division multiple access), FDMA (frequency-division multiple access), and CDMA (code-division multiple access) schemes. In CDMA communications, different wireless channels are distinguished by different channelization codes or sequences that are used to encode different information streams, which may then be modulated at one or more different carrier frequencies for simultaneous transmission. A receiver may recover a particular stream from a received signal using the appropriate code or sequence to decode the received signal.

For voice applications, conventional cellular communication systems employ dedicated links between a wireless unit and a base station. Voice communications are delay-intolerant by nature. Consequently, wireless units in wireless cellular communication systems transmit and receive signals over one or more dedicated links. Here, each active wireless unit generally requires the assignment of a dedicated link on the downlink, as well as a dedicated link on the uplink.

With the explosion of the Internet and the increasing demand for data, resource management has become a growing issue in cellular communication systems. Next generation wireless communication systems are expected to provide high rate packet data services in support of Internet access and multimedia communication. Unlike voice, however, data communications are relatively delay tolerant and typically bursty. Data communications, as such, do not require dedicated links on the downlink or the uplink, but rather enable one or more channels to be shared by a number of wireless units. By this arrangement, each of the wireless units on the uplink competes for available resources. Resources to be managed in the uplink include the received power at the base station, and the interference created by each user to other users in the same sector or cell, as well as in other sectors or cells, for example. This is in contrast to the resources to be managed on the downlink, including fixed transmit power budgets.

In view of the need for resource management in data communication, it should be noted that the ultimate bit rate in which a communication system operates might be derived using Shannon's limit to information theory. Shannon's limit is based on a number of different parameters. These Shannon's limit parameters include, for example, the total power radiated at the transmitter, the number of antennas at the transmitter and receiver, available bandwidth, noise power at the receiver, and the characteristics of the propagation environment.

The transmission rate of data in a wireless communication system depends on the total power available at the particular wireless unit, the quality of the radio link, and the received power and interference levels that may be tolerated by all the base stations receiving the signal from the wireless unit. Quality of service provisioning will attempt to guarantee a desired throughput or delay for a specific application for each wireless unit. On the other hand, effective resource management enhances the efficiency of the wireless communications system, thereby improving the overall system throughput. Additionally, there may be other tangible benefits to "smart" or "intelligent" channel utilization methods, such as hybrid ARQ and/or incremental redundancy, for example.

Presently, resource management schemes for data applications have concentrated on the downlink. These known solutions have proposed centralizing the operations at the base station or equivalent (e.g., inter-working function). The base station provides a route for all requests from wireless units on the uplink, as well as all responses to the wireless unit on the downlink. Consequently, the base station serves as a focal point for all requests even if the data has to be fetched from another source location. The base station, therefore, may be used as a server for performing a centralized scheduling operation in determining which wireless units receive data, when they may receive the data, for how long they may receive the data, and at what rate they may receive data.

Resource management and channel allocation on the uplink, to date, has been primarily treated as a "distributed control" concern. Here, the base station does not control the operations by assigning service order priorities. The base station, however, may supervise access to the uplink and monitor operations via slow or fast power control. For example, in CDMA2000 1×systems, each wireless unit makes a request for an uplink channel at a specific rate. The base station monitors the interference patterns and determines whether to allow the wireless unit making the request access to an uplink channel. If the wireless unit is granted access, subsequent transmissions may be power controlled. In 1×EV-DO systems, uplink access may be controlled by allowing each wireless unit begins to transmit autonomously, initially at the lowest rate in the rate set. At every subsequent transmission, each wireless unit autonomously doubles its data rate, while the base station continuously manages the channel via power control. If the aggregate received power at the base station or the interference to each wireless unit exceeds a predefined threshold, the base station orders all wireless units to reduce their data rates.

These known schemes for managing resources and channel allocation in data applications on the uplink have a number of shortcomings. Firstly, wireless units on the uplink are not scheduled for gaining access to the base station's resources. The wireless communication system's operation, consequently, is neither efficient nor is its throughput optimized. Moreover, quality of service requirements is considerably more difficult to realize without a scheduling system.

Therefore, a need exists for a scheduling system to manage the base station's resources and channel allocation in data applications with respect to wireless units on the uplink.

SUMMARY OF THE INVENTION

The present invention provides a method of scheduling data communication over an uplink. More particularly, the present invention offers a method of scheduling wireless units or users for transmitting data over the uplink in response to each user's path loss. Likewise, the present invention also offers a method of scheduling a plurality of data transmissions over the uplink in response to the path loss associated with each data transmission. For the purposes of the present invention, path loss may be defined as the ratio of the power received by the wireless unit from the base station to the power transmitted by the wireless unit. The receiver, here, may be a base station and the transmitter may be a wireless unit or user.

In one embodiment of the present invention, the method enabled one or more users seeking to transmit data over the uplink to be scheduled in response to their path loss. More particularly, the user having the most attractive path loss (e.g., closest to unity, or largest, given the ratio of received power to transmitted power) among the users seeking to transmit data over the uplink may be scheduled first. Thereafter, the next user having the next most attractive path loss among the remaining users may be subsequently scheduled if the total noise rise leftover is greater than zero. This process repeats so long as all users are scheduled or until the total noise rise leftover is about zero. Consequently, not all users seeking to transmit data over the uplink are guaranteed scheduling. Total noise rise leftover may be defined as the difference between the total target noise rise and the multiple access interference to the base station from voice communication within the cell, as well as interference from neighboring, adjacent and/or other cells/sectors.

In another embodiment of the present invention, each user is scheduled by taking its path loss into consideration, as well as its throughput. Throughput, here, may be defined as the throughput achieved up to the scheduling instant or a monotonically increasing function of throughput. More particularly, a ratio of a channel transmission rate to a throughput rate for each user is determined. It should be noted that the channel transmission rate may be defined by channel bandwidth (w), an instantaneous path loss ($h_i$), the total interference $I_T$, and a maximum transmit power (P), expressed by the mathematical equation of $w*\log(1+h_i*[P/I_T])$ when considering the interference or $w*\log(1+h_i*P)$ when the interference term to calculate the maximum channel transmission rate—e.g., the rate based on no interference and just signal attention due to path loss. Thereafter, the user having the largest ratio may be scheduled first. This process repeats, taking the next available user having the largest ratio among the remaining users, until all users are scheduled or until the total noise rise leftover is about zero.

In yet another embodiment of the present invention, each user is scheduled by taking its path loss into consideration, as well as the delay(s) in transmitting the data over the uplink. More particularly, a deadline for each user to be scheduled is determined based on a normalized delay (S(t)) of the wireless communication system, a request size ($J_i$) for the data to be transmitted over the uplink by each user, the channel transmission rate ($R_i$) for each user, and an arrival time ($a_i$) of a request for transmitting the data over the uplink from each user. Using these variables, a deadline for each user may be calculated by the mathematical equation of $S(t)*[J_i/R_i]+a_i$. Thereafter, the user having the earliest deadline ratio may be scheduled first. This process repeats, taking the next available user having the next earliest deadline among the remaining users until all users are scheduled or until the total noise rise leftover is about zero.

BRIEF DESCRIPTION OF THE DRAWINGS

The present invention will be better understood from reading the following description of non-limiting embodiments, with reference to the attached drawings, wherein below:

FIG. 1 depicts a flow chart of an embodiment of the present invention;

FIG. 2 depicts a flow chart of another embodiment of the present invention; and

FIG. 3 depicts a flow chart of yet another embodiment of the present invention.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides a method of scheduling data communication over an uplink. The present invention offers a method of scheduling wireless units or users for transmitting data over the uplink in response to each user's path loss. Alternatively, the present invention provides a method of scheduling a plurality of data transmissions over the uplink in response to the path loss associated with each data transmission.

Referring to FIG. 1, a flow chart 10 of an embodiment of the present invention is illustrated. Flow chart 10 depicts a method of uplink scheduling a plurality of wireless units or users. Each user seeking to transmit data over the uplink initially transmits a request to a base station within the cell/sector. Upon receiving each of these requests within a defined time period, the base station determines the path loss for each user (step 20). The path loss for each user is calculated from a ratio of the power received by the base from the user to the power transmitted by that user in the pilot channel.

As the transmit power is not immediately known to the base station, one method for calculating this value is using the pilot reference channel. Here, the user sends a periodic update of the transmit power employed for that instant of the pilot transmission. In between these periodic updates, the base station may keep track of the transmit power using the power control commands sent by the base station to the mobile station.

Thereafter, the base station examines the total noise rise leftover in view of the path loss for each of the users seeking to transmit data over the uplink. Total noise rise leftover may be defined as the difference between the total noise rise and the interference to the base station from voice communication within the cell/sector, as well as interference from neighboring, adjacent and/or other cells/sectors. The total noise rise may be based on the total power received at the base station and should not exceed a threshold defined as a function of the thermal noise. In one example, this threshold may be about 7 db.

The base station, subsequently, schedules users by the calculated path losses taking the total noise rise leftover into account. Here, the base station compares the calculated path losses for each of the users. If the total noise rise leftover is greater than zero, the user having the most attractive path loss (e.g., closest to unity, or largest, given the ratio of received power to transmitted power) determined path loss is scheduled first (step 30). Once the first user is scheduled, the base station examines the total noise rise leftover (step 40). If total noise rise leftover is still greater than zero, the next user may be scheduled (step 50). This next user is selected by having the next most attractive determined path loss of the remaining non-scheduled users. This process of examining the total noise rise leftover and scheduling continues through a feedback loop 55 until either all the users seeking access are scheduled or total noise rise leftover is about zero (step 60). Consequently, a possibility exists that all users may not be scheduled because of the value of the total noise rise leftover.

Referring to FIG. 2, a flow chart 100 of another embodiment of the present invention is illustrated. Flow chart 100 depicts an alternative method of uplink scheduling a plurality of wireless units or users. Initially, each of the users transmits a request to a base station within the cell for access over the uplink. Once these requests are received within a defined time period, the base station determines channel transmission rate ($R_i$) of each user (step 110). Each channel transmission rate ($R_i$) determination is a function of the path loss of each user. More particularly, the channel transmission rate ($R_i$) of each user may be determined by the following mathematical equation:

$$R_i = w^* \log(1 + h_i^* P)$$

where w is the bandwidth of the channel, $h_i$ is the instantaneous path loss, and P is the maximum transmit power for each user. It should be noted that the channel transmission rate may be calculated without interference, as shown above, or, alternatively, taking interference into consideration. By overlooking the interference term, the maximum channel transmission rate may be calculated—e.g., the rate based on no interference and just signal attention due to path loss. If considering the interference, the mathematical equation should be $w^* \log(1 + h_{i^*[P/I_T]})$, where $I_T$ is the total interference.

Thereafter, the base station determines the throughput ($T_i$) of each user seeking access over the uplink to transmit data (step 120). The throughput, here, may be measured by the base station. Alternatively, throughput may be derived from each user achieved up to the scheduling instant or a monotonically increasing function of throughput.

With the channel transmission rate ($R_i$) and the throughput ($T_i$) determined for each user, the base station might then begin the process of scheduling. More particularly, the base station calculates the ratio of the channel transmission rate ($R_i$) to the throughput ($T_i$) for each user (step 130). The base station then compares the ratios for each of the users, scheduling the user having the largest ratio first (step 140).

In contrast with the method corresponding with the flow chart 10 of FIG. 1, the present embodiment supports a method for scheduling all users seeking uplink access, though this may be limited by the available noise rise. Consequently, after the first user having the largest ratio is scheduled (step 140), the base station examines whether all users have been scheduled or if the noise rise threshold has been exceeded (step 150). If the base station determines that not all users have been scheduled, the next user having the next largest ratio relatively to the just previously scheduled user is scheduled (step 160). This process of examining the ratio of the remaining users continues through a feedback loop 165 until all the users seeking access are scheduled or until the noise rise threshold has been reached (step 170).

Referring to FIG. 3, a flow chart 200 of yet another embodiment of the present invention is illustrated. Flow chart 200 depicts a further alternate method of uplink scheduling a plurality of wireless units. Initially, each of the users transmits a request to a base station within the cell/sector for access over the uplink. After a defined time period passes within with these requests are received, the base station calculates a deadline (Di) for each user (step 210). Each deadline takes the path loss of each user into consideration. More particularly, the deadline ($D_i$) of each user may be determined by the following mathematical equation:

$$D_i = S(t)^* [J_i/R_i] + a_i$$

where S(t) is a normalized delay of the wireless communication system, $J_i$ is the request size of the data to be transmitted over the uplink, $R_i$ is the instantaneous channel transmission rate, and $a_i$ is the arrival time of the request for transmitting the data over the uplink. It should be noted that channel transmission rate, as detailed hereinabove, is based on the path loss of the user.

Once the deadline ($D_i$) for each user is determined, the base station may then begin the process of scheduling. The base station first compares the calculated deadlines to one another and schedules the user with the earliest deadline first (step 220). The base station then examines whether any users requiring scheduling remain or if noise rise threshold has not been reached (step 230). If the base station determines that not all users have been scheduled, the next user having the next earliest deadline relatively to the just previously scheduled user is scheduled (step 240). This process of examining the deadlines of the remaining users continues through a feedback loop 245 until all the users seeking access are scheduled or until the noise rise threshold has been reached (step 250).

The present invention may function with any centralized protocol and interference management scheme. Additionally, the present invention enables the use of advanced techniques, such as hybrid ARQ and various forms of incremental redundancy, for example. The techniques disclosed hereinbelow are applicable if either fast rate adaptation or conventional power control is used.

In CDMA systems, the reverse link or uplink consists of users transmitting individually with little or no synchrony. Data from a user can be classified into three broad categories: control information, such as power control bits and channel quality information, protocol/signaling information (e.g., access reservation requests), and actual data traffic relevant to the service. These and other classes of data are usually spread using separate Walsh codes. For example, the first Walsh code may be designated for signaling, the second for protocol information, and the third and fourth for voice and/or data services respectively. These spread messages are then combined and further spread using the user-specific long code. The initial Walsh spreading is done to enable the base station to differentiate between the categories of data, and the subsequent long code spreading is done to differentiate between users.

For example, Walsh code 2 may be used for making requests for channels to transmit over the uplink. If the reservation is accepted and a reverse link transmission is scheduled, the data is then sent along Walsh code 4. During a given transmission, any combination of these Walsh codes may be employed, thereby enabling the users to send control information, as well as make reservations, along with traffic channel data simultaneously. The user-specific long codes may be generated as in current CDMA systems such IS-95, IS-2000, or UTRAN—these are applied on top of the Walsh coded streams and help distinguish one user's signal from another. Due to the use of user-specffic long codes, every user can use the same set of Walsh codes.

One example of the control channels required—including bit budgets—is outlined as follows. These channels may be sent over separate Walsh codes or may be time-multiplexed onto a single code. This structure may be used for implementing a protocol as part of a method of scheduling data communication over the uplink in accordance with the present invention.

The Reverse Pilot Reference Channel

This channel carries the transmit power employed for the user's Reverse Pilot Channel. It may consist of a 6-bit field transmitted once every 10 ms for example, and further aids the base station in making scheduling decisions.

The Reverse Request/Update Channel

This channel may be used by the user to make new or updated scheduling requests to the base station. It may consist of a 6-bit field indicative of the size of traffic data to be transmitted (e.g., expressed as number of 768-bit packets), and may be transmitted once every 10 ms, for example.

The Reverse Rate Indicator Channel

This channel may be employed by the user to indicate the data rate used on the Reverse Packet Data Channel. This 4-bit field may be sent to the base station to facilitate decoding in a single slot, associated with every packet. If the base station and the user are not implicitly aware of the information block size to be used on the data traffic channel, then additional bits may be added to carry this information.

The Reverse Hybrid ARQ Control Channel

This channel carries control information to aid in the Hybrid ARQ operation at the base station receiver.

It may be advantageous for the base station in the uplink to ensure that the amount of noise rise above thermal does not exceed a preset threshold. Equivalently, noise rise management strategies attempt to make sure that the amount of received power at the base station, at any given instant, does not exceed the preset threshold. As a result, in any centralized uplink resource management scheme, the base station may measure the amount of received power and determine the remaining power that it can receive without exceeding the noise rise budget and then determines which user to support at that instant.

Centralized uplink resource management may consist of a multiple access protocol in which packet data mobile stations make requests for uplink channel resources. The request messages transmitted by the user inform the base station of service parameters. Examples of such service parameters are the transmit power class of the user and the amount of data to transmit. The base station processes the received request messages and performs interference management calculations. These calculations may aid scheduling algorithms in computing service order priorities and optimizing for network and user throughputs. A set of interference management schemes may prevent the occurrence of catastrophic levels of interference while maximizing the utilization of resources on the uplink.

Typically, the base station measures channel conditions for each user individually, based on the information received from the user. The base station, subsequently, computes the maximum receivable power on the packet data channel and the corresponding data rate. The value of this rate at any given instant is common to all users. Hence, this rate may be achievable independent of which user transmits. The difference, however, is that depending on the channel quality of the user the amount of transmit power required to achieve the desired rate will greatly differ. For example, users with good channel conditions may achieve the desired rate with less power compared to users with bad channel conditions. Since these channel conditions may vary rapidly with time, the amount of transmit power required at any given instant may also varies rapidly with time. Consequently, selecting users corresponds with picking users who require less transmit power for the desired rate. As far as the network is concerned, picking users with good channel conditions may lead to less interference created to neighboring base stations. The amount of tolerable noise rise at any given instant may also increase with a corresponding decrease in other cell interference, and hence, selecting users with desirable channel conditions may lead to improvements in network efficiency.

EXAMPLES

Example I

At any given instant, the user with the least instantaneous path loss coefficient may be scheduled. The path loss coefficient may be determined by looking at the ratio of the received power to transmit power of the pilot. The instantaneous transmit power may be estimated based on the periodic pilot reference feedback received from the user (e.g., in the pilot reference channel) and the power control commands sent to the user by the base station.

Another variation of the same principle involves the following procedure: for the $i^{th}$ user, compute the maximum rate that can be achieved by the user, if ignoring the interference, using the formula $R_i = w * \log(1 + h_i * P_i)$ where w is the bandwidth of the channel, $h_i$ is the instantaneous path loss coefficient and $P_i$ is the remaining power available at the user (e.g., maximum transmit power minus the power used to transmit pilot and other control channels). The user with the largest value of $R_i$ may then be scheduled. Note that w is common to all users and hence for a given value of $P_i$, lower the value of $h_i$ larger the value of $R_i$. In this algorithmic example, the value of $R_i$ is used only for scheduling but not for transmission—the transmit rate is determined by the base station based on noise rise measurements as pointed out earlier.

Example II

At any given instant, the value of $T_i = w * \log(1 + P_i * h_i)/t_i$ for each user may be computed, where $t_i$ is a measure of the throughput the user has experienced over a finite window—however, any monotonically increasing function of the throughput may be used in place of $t_i$. The scheduling algorithm works by scheduling the user with the largest value of $T_i$. The value of $t_i$ could be computed in many ways: for example, a simple aggregate of the bits transmitted by the user divided by the size of the time window may be user. Alternatively, some kind of filter to estimate a weighted average of the bits transmitted by the user may also be used. Further, the value of the numerator rate in $T_i$ may be used for scheduling and not, generally, for transmission—the transmit rate is determined by the base station based on noise rise measurements as pointed out earlier.

Another variation of the same principle involves the following procedure: for the $i^{th}$ user, a normalized value of path loss $h_i$ satisfying the equation $t_i = w*\log(1+h_i*P_i)$ is computed. Next, the user with the most attractive normalized $h_i$ may be scheduled. Once again, w is the bandwidth of the channel, and $h_i$ is the value of the instantaneous path loss coefficient.

Example III

At any given instant, the maximum rate achievable by the user using the formula $R_i = w*\text{Log}(1+h_i*P_i)$ can be computed, where w is the bandwidth of the channel, $h_i$ is the instantaneous path loss coefficient and $P_i$ is the remaining power available at the user (e.g., maximum transmit power minus the power used to transmit pilot and other control channels). For each user, let $J_i$ be the size of the request (e.g., made by the $i^{th}$ user in the request update channel). Let $a_i$ be the arrival time of the request. The deadline, Di, may then be computed for the $i^{th}$ user using the equation $S\,J_i/R_i + a_i$. Next, the user may be scheduled with the earliest deadline. Once again, the transmit rate may be determined by the base station based on noise rise measurements.

In the equation for the deadline, S is called the system stretch, which is a measure of the normalized delay experienced in the system at that instant in time. Various methods to compute the system stretch may be known. For example, for every request completed, the base station scheduler may compute the ratio of the response time (which is the completion time minus the arrival time) to serve the request to the minimum value of response time that would have been required to serve the request assuming that no other users are in the system. This estimate may be based on a history of the instantaneous channel rate for the given request size. This ratio of actual response time to estimated response time is called "stretch" of that complete request, and the system stretch is the maximum of all the stretches of completed jobs over a given time window. The system stretch could also be computed using an average of the stretches of the completed request. Another variation involves computing the system stretch based on a history of stretches of completed requests as well as estimates of stretches of requests in progress. Independent of the method to compute system stretch, the deadline based algorithm is applicable.

Example IV

At any given instant, the size of the request remaining in queue (estimated by using record of the request size originally received by the base station minus the transmitted bits so far) may be set to $j_i$ and $R_i = w*\log(1+h_i*P_i)$ be the instantaneous rate achievable by the $i^{th}$ user, (where w is the bandwidth of the channel, $h_i$ is the instantaneous path loss coefficient and $P_i$ is the remaining power available at the user or, in other words, the maximum transmit power minus the power used to transmit pilot and other control channels). Here, $RT_i$ = ratio of $j_i$ to $R_i$. Next, the user with the least value of $RT_i$ may be scheduled. Once again, the transmit rate may be determined by the base station based on noise rise measurements.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method comprising:
   scheduling at least one of a plurality of users for transmitting data over an uplink based on a noise rise leftover associated with each user, wherein the users are prioritized by their path loss such that the user of the plurality with the least path loss is scheduled for transmitting data first, and wherein the user with the next least path loss is scheduled after the user with the least path loss if the noise rise leftover associated with the user with the next least path loss is greater than zero.

2. The method of claim 1,
   wherein the users are prioritized in response to a ratio of a channel transmission rate to a throughput and/or a monotonically increasing function of the throughput for each user such that the user of the plurality with the largest ratio is scheduled first.

3. The method of claim 2, wherein another user with the next largest ratio is scheduled after the user with the largest ratio.

4. The method of claim 2, wherein the channel transmission rate of each user is determined from at least one variable selected from the group comprising channel bandwidth (w), instantaneous path loss (hi), maximum transmit power (P) and total interference (IT).

5. The method of claim 4, wherein each channel transmission rate is calculated by a mathematical expression of $w*\log(1+_i*P)$ or a mathematical expression of $w*\log(1+_i*P[P/I_T])$.

6. A method comprising:
   scheduling at least one of a plurality of users for transmitting data over an uplink based on a noise rise leftover associated with each user, wherein the users are prioritized in response to deadlines for each user such that the user of the plurality with the earliest deadline is scheduled first.

7. The method of claim 6, wherein the user with the next earliest deadline is scheduled after the user with the earliest deadline.

8. The method of claim 7, wherein the deadline for each user is determined from at least one variable selected from the group comprising normalized delay (S(t)), request size ($J_i$) for the data to be transmitted over the uplink, channel transmission rate ($R_i$), arrival time (ai) of a request for transmitting the data over the uplink, and total interference ($I_T$).

9. The method of claim 8, wherein each deadline is calculated by a mathematical expression of $S(t)*[J_i/R_i]+a_i$, and each channel transmission rate ($R_i$) is determined from a channel bandwidth (w), an instantaneous path loss (hi) and a, maximum transmit power (P) by a mathematical expression of $w*\log(1+_i*P)$ or a mathematical expression of $w*\log(1+_{1[P/IT]})$.

10. The method of claim 6, wherein the data transmissions are prioritized by their path loss such that the data transmission of the plurality with the least path loss is scheduled first.

11. A method comprising:
scheduling at least one of a plurality of data transmissions for reception over an uplink based on a noise rise leftover associated with each data transmission, wherein the data transmissions are prioritized by their path loss such that the data transmission of the plurality with the least path loss is scheduled first, and wherein the data transmission with the next least path loss is scheduled after the data transmission with the least path loss if the noise rise leftover associated with the data transmission with the next least path loss is greater than zero.

12. The method of claim 11, wherein the data transmissions are prioritized in response to a ratio of a channel transmission rate to a throughput for each data transmission such that the data transmission of the plurality with the largest ratio is scheduled first.

13. The method of claim 12, wherein the data transmission with next largest ratio is scheduled after the data transmission with the largest ratio.

14. The method of claim 12, wherein the channel transmission rate of each data transmission is determined from at least one variable selected from the group comprising channel bandwidth (w), instantaneous path loss ($h_i$), maximum transmit power (P) and total interference ($I_T$).

15. The method of claim 14, wherein each channel transmission rate is calculated by a mathematical expression of $w*\log(1+_i*P)$ or a mathematical expression of $w*\log(1+_i*[P/I_T])$.

16. A method comprising:
scheduling at least one of a plurality of data transmissions for reception over an uplink based on a noise rise leftover associated with each data transmission, wherein the data transmissions are prioritized in response to deadlines for each data transmission such that the data transmission of the plurality with the earliest deadline is scheduled first.

17. The method of claim 16, wherein the data transmission with the next earliest deadline is scheduled after the data transmission with the earliest deadline.

18. The method of claim 16, wherein the deadline for each data transmission is determined from at least one variable selected from the group comprising normalized delay (S(t)), request size ($J_i$) for the data to be transmitted over the uplink, channel transmission rate ($R_i$), and arrival time ($a_i$) of a request for transmitting the data over the uplink.

19. The method of claim 18, wherein the deadline of each uplink data transmission is calculated by a mathematical expression of $S(t)*[J_i/R_i]+a_i$, and each channel transmission rate ($R_i$) is determined from a channel bandwidth (w), an instantaneous path loss ($h_i$)' a maximum transmit power (P) and total interference ($I_T$) by a mathematical expression of $w*\log(1+_i*P)$ or a mathematical expression of $w*\log(1+_i*[P/I_T])$.

* * * * *